B. F. SHAUGHNESSY.
GAGING INSTRUMENT.
APPLICATION FILED OCT. 18, 1913.
1,179,142.
Patented Apr. 11, 1916.
2 SHEETS—SHEET 2.
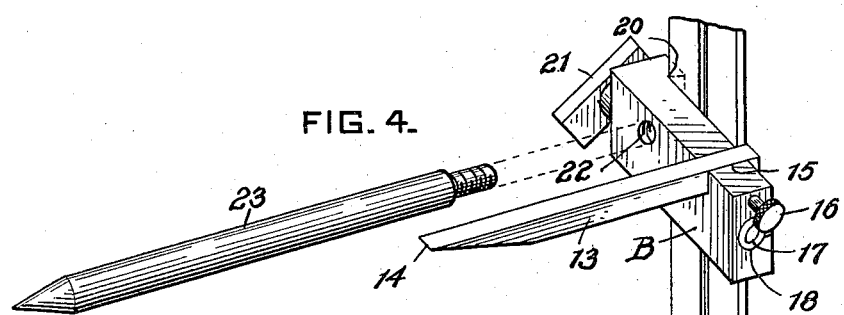
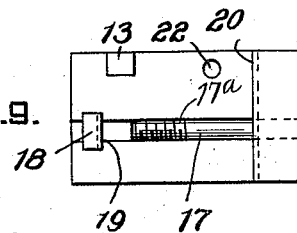
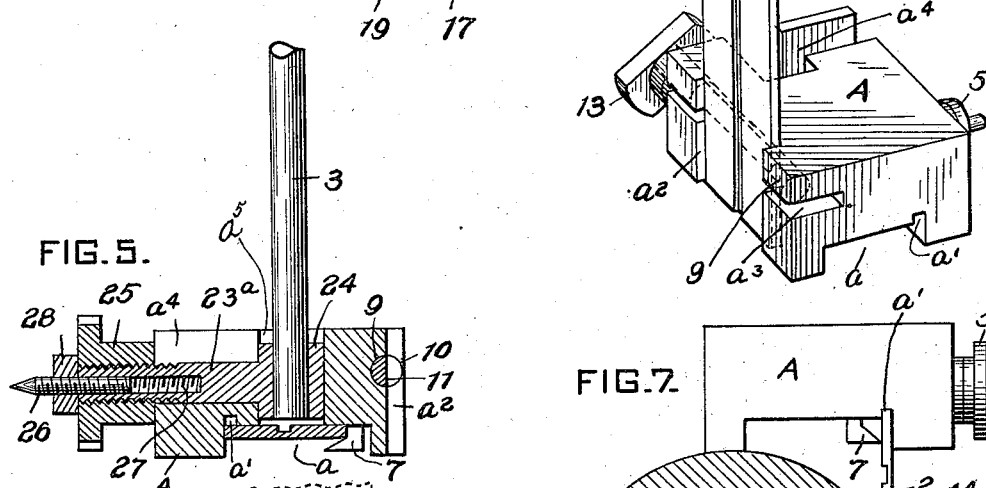
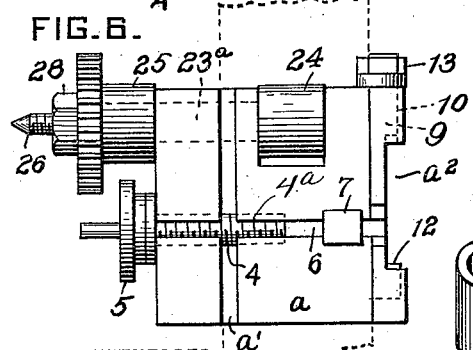
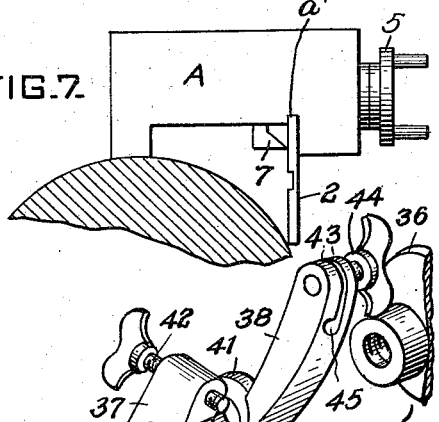
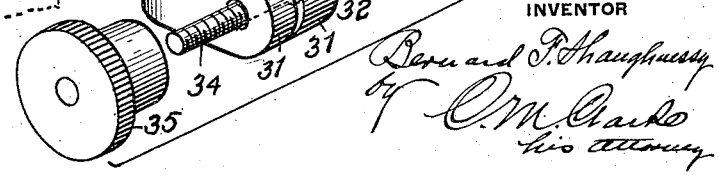

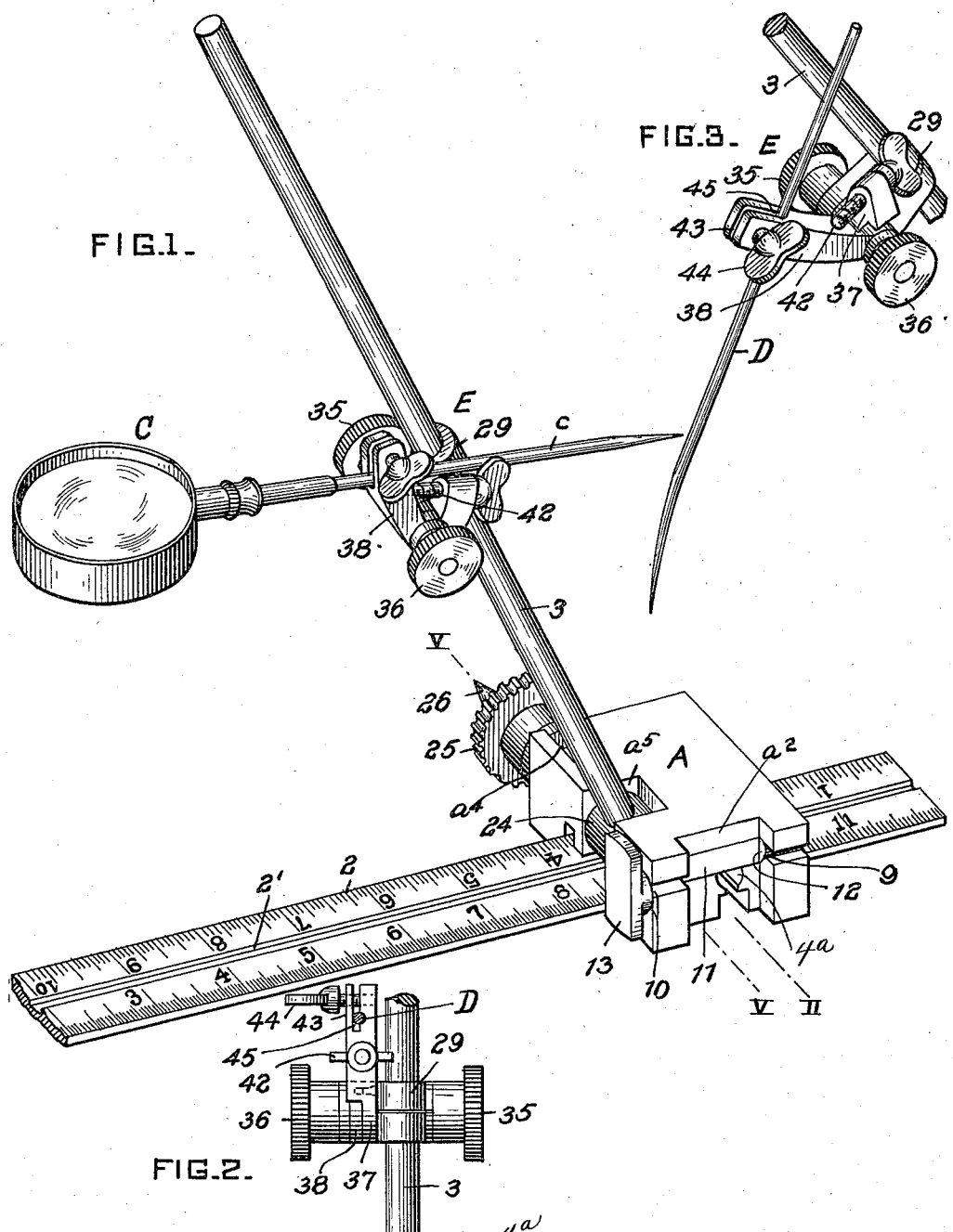

UNITED STATES PATENT OFFICE.

BERNARD F. SHAUGHNESSY, OF PITTSBURGH, PENNSYLVANIA.

GAGING INSTRUMENT.

1,179,142.  Specification of Letters Patent.  Patented Apr. 11, 1916.

Application filed October 18, 1913. Serial No. 795,903.

*To all whom it may concern:*

Be it known that I, BERNARD F. SHAUGHNESSY, a citizen of the United States, residing at Pittsburgh, in the county of Allegheny and State of Pennsylvania, have invented certain new and useful Improvements in Gaging Instruments, of which the following is a specification.

My invention consists of an improved combination gaging instrument and has for its object to provide an instrument of the general class known as a surface gage, provided with means for attachment of various instruments or parts, adapting it to various uses and purposes, the several parts being suitably interchangeable in position, or for other parts, as shall be more fully hereinafter described, and as illustrated in the accompanying drawings.

In said drawings, Figure 1 is a perspective view showing the invention applied to the use of a scale and a reading glass. Fig. 2 is a cross sectional view, taken on the line II. of Fig. 1. Fig. 3 is a perspective detail view, showing the application and adjustment of a needle for use as a surface gage. Fig. 4 is a perspective view showing the device as used for measuring vertical distances from a horizontal plane or surface. Fig. 5 is a detail cross sectional view on the line V.V. of Fig. 1. Fig. 6 is a plan view of the supporting base. Fig. 7 is an edge view of the base, showing it provided with a straight edge and applied to use on a cylindrical body. Fig. 8 is a collective perspective detail view showing the several parts of the adjustable instrument support. Fig. 9 is a view of the bar-supporting block of Fig. 4 in rear elevation.

The foundation or basic element of the invention consists of a generally rectangular block A provided with a plurality of cavities or recesses for insertion of a rule or scale 2 and a supporting stem 3, the block A having adjustable holding devices for fixedly engaging such parts and for holding them in position. Thus, the base or block A is adapted to receive and fixedly hold the rule 2 in a plurality of positions, with relation to the surfaces of the block, for various purposes, as a square or gage, the block having across its faces a series of holding recesses $a$, $a'$, $a^2$, $a^3$, disposed as to direction and depth in such a manner as to receive the scale 2 and hold it fixedly, for whatever purpose or use may be intended.

For the purpose of holding the gage 2 fixedly across the bottom of block A, (see Figs. 1 and 2) the block is provided with a clearance slot $4^a$ and a threaded screw 4 having an actuating turning terminal 5 engaging one side of the block by its hub, the other end of the screw 4 being threaded into a holding nut 6 having a receiving and clamping neck formed to provide an inwardly turned edge 7, preferably tapered at its under side. By such means, the scale 2 is fixedly clamped in position upon proper adjustment of the screw. As shown in Fig. 2, the scale 2 may also be inserted edgewise in cavity $a^3$ of block A and held therein by a laterally projecting lug 8 of nut 6, engaging the usual central groove or slot $2'$ of the scale, whereby to fixedly position and hold the scale edgewise in the block, with its free edge projecting therebeyond. When used as a surface gage, the scale 2 is set in cavity or recess $a^2$ of base A in an upright position, as shown in Fig. 4, the block in such case being used upon a flat horizontal surface, and the scale being set down flush with its under supporting side and in contact with such surface. For the purpose of holding the scale 2 in such upright position, the block A is provided with an adjusting clamping stem 9, circular in cross section, fitting within a receiving socket 10 passing through the block and at each side of recess $a^2$. Stem 9 is partially cut away, providing a flat surface 11 which is flush with the inner surface of the block at the base of the opening $a^2$, the stem at each side of such cut-away portion being provided with a shoulder. One of said shoulders 12 is adapted to engage and clamp the scale 2 edgewise, binding its other edge against the opposite wall of the cavity $a^2$, fixedly holding it in rectangular relation to the block, as shown in Fig. 4. Stem 9 is threaded at one end and is provided with an adjusting terminal nut 13 having thread engagement therewith by which it may be tightened or loosened.

When it is desired to use the block and scale as a cylindrical gage or scriber, as in marking key-ways, the scale 2 is set into cavity $a'$, as shown in Fig. 7, and nut 6 is adjusted to holding position, its terminal 7 binding against the face of the scale, fixedly holding it in rectangular relation to the block and in such position as to adapt the block and scale to be used for such purpose. As shown in this figure, the edge portion of the block is laid along the face of the cylindrical body to be marked or scribed, thereby fixedly locating the edge of the scale in absolute parallelism to the axial center of the shaft, etc.

When desired, a supplemental attachment B may be used for the purpose of locating a height-determining device, as a bar 13 having the edge 14, the bar being fixedly secured in a receiving recess 15 by a set screw 16, as in Figs. 4 and 9.

For the purpose of clamping block B at any desired height on scale 2, the block is provided with a clearance slot 17$^a$ and a shaft 17 threaded into a receiving nut 18 having an inwardly turned terminal 19 adapted to grip the edge of the scale 2 against the edge 20 of a recess in the block, in the same manner as the nut 6 and its terminal 7 operate. Shaft 17 is provided with an adjusting thumb terminal 21, like terminal 5. Block B is also provided with one or more threaded openings 22 for the attachment of the threaded terminal of a stem 23 having a terminal point, as shown, adapting the device to be used as a scriber or scribing compass.

In such use as a scribing compass, the scale 2 may be mounted in cavity $a^2$ opposite to point 26 and block B adjusted and secured, with the point of stem 23 at the same side as point 26, so that one of the points may be used as a center and the other as a circle or arc describing scriber.

For the purpose of holding stem 3 at any desired position or angle in block A, it is provided with a cylindrical supporting neck 23$^a$ having a terminal boss 24, into which stem 3 is fixedly set. Neck 23$^a$ is seated within a semi-cylindrical receiving cavity $a^4$ of base A, an enlarged cavity $a^5$ being provided for reception and rotation of hub 24, and providing a shoulder against which hub 24 bears as clearly shown in Figs. 1 and 5.

The neck 23$^a$ extends beyond one side of block A and is threaded and provided with a terminal adjusting nut 25, whereby the neck may be fixedly tightened at any desired position to lock the supporting stem 3 at the desired angle to one of the faces of the block A. Extending centrally through and beyond neck 23$^a$ is a threaded and pointed stem 26, threaded into a receiving cavity 27 and having a tightening nut 28, by which construction the point 26 may be moved inwardly or outwardly with respect to neck 23$^a$ and fixedly held.

For the purpose of fixedly holding any desired object, as a reading glass C or a surface gage needle D at the desired position upon upright stem 3, I have provided the clamping and holding device generally represented by the letter E, and shown collectively in detail in Fig. 8. This mechanism consists of a split hub 29 having a transverse opening 30 for engagement of the stem 3 and extended sides 31, 31, through which presses a tightening bolt 32, threaded at each end, as at 33 and 34 respectively.

Threaded portion 34 is provided with a tightening thumb nut 35, while a similar thumb nut 36 is screwed upon the other threaded end 33. Between thumb nut 36 and the adjacent wing 31 of hub 29 are inserted the adjustable members 37 and 38 respectively, adapted to co-act for the purpose of holding the surface gage stem D or c of the reading glass in any desired position. The innermost of such members 37 constitutes a fixedly located hub having a series of openings 39 adapted to engage singly a holding pin 40 extending inwardly of wing 31, whereby the hub 37 may be located in any desired position with relation to the wing 31, and, incidentally, with relation to the stem 33.

Sleeved about bolt 32 by its hub 41, the arm 38 may be clamped with considerable frictional resistance by the hub of thumb nut 36. The arm 38 may then be very accurately adjusted outwardly by manipulation of thumb screw 42, and arm 38 then tightened in position by nut 36. Arm 38 is provided with a bifurcated terminal, the members 43 of which are drawn together by an adjusting thumb screw 44, whereby to fixedly hold the stem D or c or any other similar device in the receiving opening 45 of the arm.

By this mechanism it will be observed that the stem 3 having been located generally in the desired position, any device held in the opening 45 of arm 38 may thereafter be very accurately adjusted by manipulation of the thumb screw 42. This is a feature of very considerable advantage in that it obviates the necessity and trouble of making accurate adjustments by the principal holding mechanism in the base, thereby avoiding any possible inaccuracies. When used as a surface gage, it is capable of a very wide range of adjustments which can be quickly obtained, either as to the maximum or minimum limitations. All moving parts can be firmly clamped in position when the desired settings have been obtained, the supporting spindles being fixedly clamped by knurled nuts, avoiding any possibility of play in the working parts after the spindle has once been clamped. The use of the device, when utilized for a reading glass, is equally facile, providing for any desired range of adjustment and avoiding the necessity of manually holding the glass, leaving both hands free for adjustment of calipers, etc., on the scale.

The various adaptations of the device render it capable of a wide variety of applications and uses. It may be employed as an ordinary square in the different formations which may be made by altering the position of the scale with relation to the base A; it may be used as a universal surface gage or as a depth gage, either above or below the base, or as a scriber, or in various other ways which will suggest themselves to the skilled mechanic or those accustomed to use of ordinary surface gages and similar devices now commonly employed.

It will be understood that the device may be variously changed or modified in construction, design or various details by the skilled mechanic, but all such changes are to be considered as within the scope of the following claims.

What I claim is:

1. A rectangular gage block having a plurality of rectangular open sided receiving openings arranged at varying planes across different faces of and within the block and at right angles to each other each embodying a bearing shoulder and having a clearance slot arranged transversely of said opening, and clamping devices arranged in correspondingly varying positions having gripping elements operable through said slots transversely of said openings with relation to said shoulders and on correspondingly varying planes for fixedly holding a scale in either of said openings.

2. A rectangular gage block having a plurality of rectangular open sided receiving openings arranged at varying planes across different faces of and within the block and at right angles to each other, each embodying a bearing shoulder and having a clearance slot arranged transversely of said opening, and a series of clamping devices arranged in correspondingly varying positions each having a gripping element operable through said slots transversely of said openings adapted to bind a device in one of said openings against said bearing shoulder and provided with a tightening screw, said clamping devices being operable on correspondingly varying planes.

3. A rectangular gage block having a shouldered receiving socket, a neck rotatably mounted in said socket and bearing against the shoulder thereof, a projecting stem mounted in said neck, a threaded stem extending endwise of said neck and rotatable therewith, and a tightening nut threaded on said neck bearing against the face of the gage block for fixedly holding and securing the neck by frictional engagement against the inner face of the socket.

4. The combination with a gage block of the class described having a receiving socket, of a cylindrical threaded neck rotatably mounted in said socket, and provided with a projecting stem having an element adapted to be located with relation to a centering point, a tightening nut threaded on said neck, a centering point centrally threaded in said neck and longitudinally adjustable therein, and a locking nut threaded on said centering point.

5. A rectangular gage block having flat exterior faces and a semi-cylindrical socket entirely within its body portion and the planes thereof, a neck rotatably mounted in said socket and extending therebeyond, a tightening thumb nut on the neck operable against one of the flat faces of the block, an upwardly projecting stem mounted in said neck and rotatable with it, holding means on said stem provided with a relatively movable adjustable hub slidably mounted on said stem and provided with a tightening screw and a limiting abutment, an adjustable stem-holding arm, an adjusting screw for said arm for fixedly holding it in position with relation to said holding means, and a hub for said adjusting screw having a series of apertures adapted to make holding engagement with the limiting abutment and to be fixedly clamped in position.

6. A rectangular gage block having a receiving socket, an upwardly projecting stem mounted in said socket and provided with a tightening device, holding means on said stem provided with a relatively movable adjustable hub slidably mounted on said stem and provided with a tightening screw and a limiting abutment, an adjustable stem-holding arm, an adjusting screw for said arm, and a hub for said adjusting screw having a series of apertures adapted to make holding engagement with the limiting abutment and to be fixedly clamped in position, substantially as set forth.

In testimony whereof I hereunto affix my signature in the presence of two witnesses.

BERNARD F. SHAUGHNESSY.

Witnesses:
H. HECK,
C. M. CLARKE.